No. 777,646. PATENTED DEC. 13, 1904.
C. WALKER.
CREAM SEPARATOR.
APPLICATION FILED MAY 28, 1904.
NO MODEL.
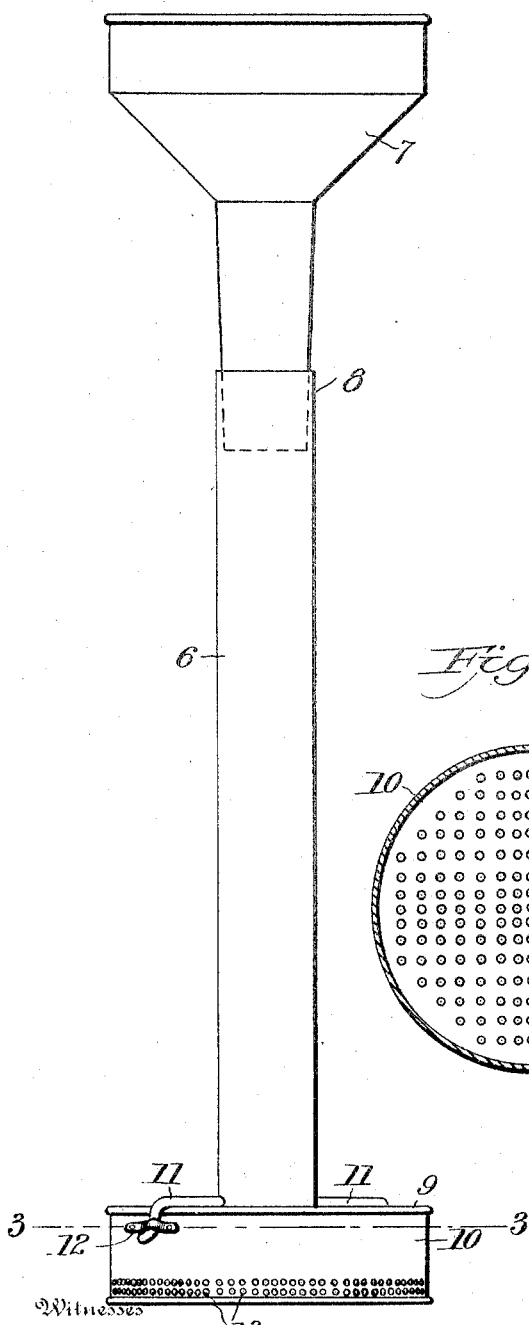
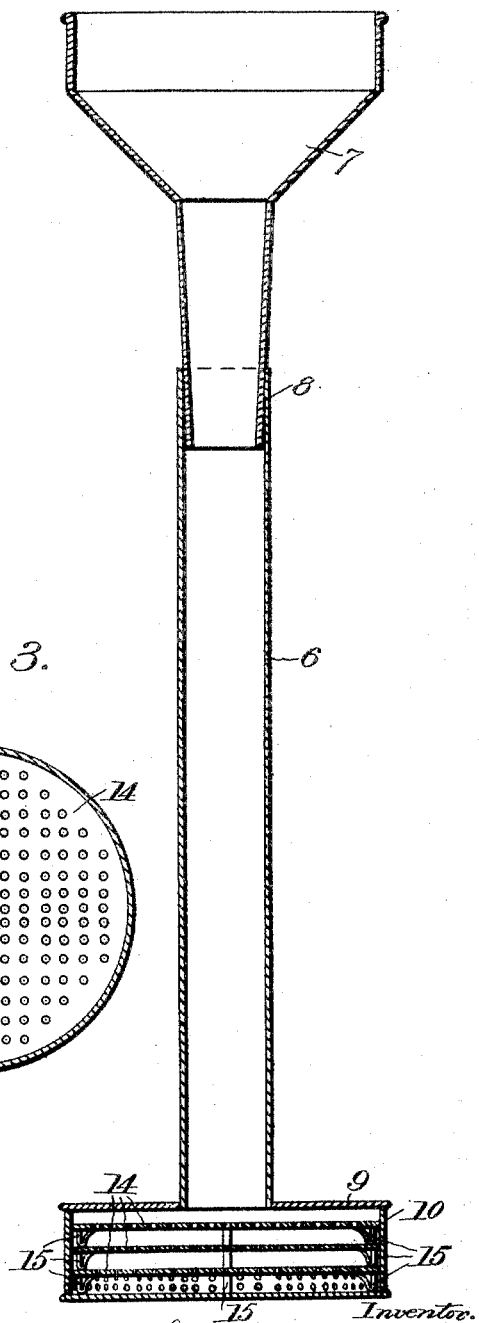
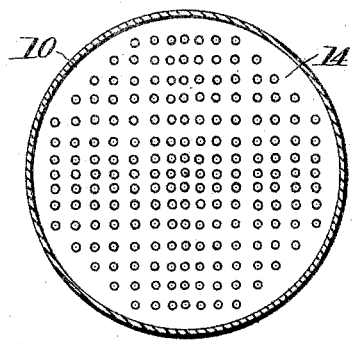

No. 777,646. Patented December 13, 1904.

UNITED STATES PATENT OFFICE.

CHARLES WALKER, OF CHICAGO, ILLINOIS, ASSIGNOR TO LIBERTY ASSOCIATION, OF WASHINGTON, DISTRICT OF COLUMBIA, A CORPORATION.

CREAM-SEPARATOR.

SPECIFICATION forming part of Letters Patent No. 777,646, dated December 13, 1904.

Application filed May 28, 1904. Serial No. 210,279. (No model.)

*To all whom it may concern:*

Be it known that I, CHARLES WALKER, a citizen of the United States, residing at Chicago, in the county of Cook and State of Illinois, have invented new and useful Improvements in Cream-Separators, of which the following is a specification.

This invention relates particularly to cream-separators of that class in which the milk is caused to flow through water in a large number of fine streams or jets, whereby the globules are exposed to the intimate action of the water to rapidly and effectively produce the separation of the cream.

In the apparatus hereinafter described the milk is caused to flow through a series of screens or perforated plates of gradually finer mesh, the effect of which is to break up the globules of milk and release the cream therefrom.

The device is illustrated in the accompanying drawings, in which—

Figure 1 is a side elevation. Fig. 2 is a central vertical section. Fig. 3 is a horizontal section on the line 3 3 of Fig. 1.

Referring specifically to the drawings, 6 indicates a tube of sufficient height—say twenty-four inches—to reach to the bottom of a vessel of water. This tube has at the top a funnel 7, with a joint 8 to facilitate separation and the cleaning of the parts. At the lower end the tube terminates in a horizontal annular disk 9 of proper size to fit over and form a cover for the pan (indicated at 10) and is held in place by the curved wire arms or rods 11, which engage under straps 12 on diametrically opposite sides of the pan.

The pan 10 has a solid bottom; but the side walls thereof are perforated with a plurality of fine perforations (indicated by 13) through which the milk is discharged. Within the pan is a series of disks, (indicated at 14,) three being shown, this number usually being found sufficient. These disks are provided with and supported by legs 15, the lower disk resting on the bottom of the pan and the upper disks on the ones below them. As above stated, the lower disks are perforated or made of foraminous material, the size of the perforations or meshes decreasing downwardly, so that the upper disk has the coarsest perforations and the lower disk the finest. The perforations 13 in the side of the pan are all below the lower disk, so that the milk must all pass through the disks before escaping.

In use the device is placed in a vessel of water and the milk is poured into the funnel and flows down the tube through the screens or disks and out into the water in a finely-divided state. In the passage of the milk through the screens its globules are finely divided or broken up, so that when it passes into the water the cream escapes and rises at once, whence it may be removed in the ordinary manner. The necessity of waiting for cream to rise by natural separation is thus avoided. The device is so constructed that it may be readily separated to be cleaned. Upon removal of the cover 9 from the pan 10 the disks 14, which are loose in the pan, may be taken out and the parts cleaned separately.

I claim—

1. A cream-separator comprising a closed pan, a series of spaced screens therein, the side of the pan having perforations below the lowest screen, and a tube extending into the top of the pan.

2. A cream-separator comprising a pan, an inlet-tube having at the lower end an annular disk forming a cover for the pan, a series of spaced screens in the pan, and an outlet from the pan below the lowest screen.

3. A cream-separator comprising a covered pan, an inlet-tube into the top thereof, and a series of spaced superposed screens in the pan, of gradually finer mesh toward the bottom, the pan having perforations in the side thereof below the lowest screen.

In testimony whereof I have signed my name to this specification in the presence of two subscribing witnesses.

CHARLES WALKER.

Witnesses:
SIGNA FELTSKOG,
H. G. BATCHELOR.